United States Patent

Peters

[15] 3,678,464

[45] July 18, 1972

[54] CONTROLLED PAUSE AND RESTART OF MAGNETIC DISC MEMORIES AND THE LIKE

[72] Inventor: Theodore Richmond Peters, Bernardsville, N.J.

[73] Assignee: Bell Telephone Laboratories, Incorporated, Murray Hill, N.J.

[22] Filed: June 29, 1970

[21] Appl. No.: 50,470

[52] U.S. Cl. ....................................340/172.5, 340/174.1 C

[51] Int. Cl. ........................................G06f 9/18, G11b 19/20

[58] Field of Search......................340/172.5, 174.1; 235/157

[56] References Cited

UNITED STATES PATENTS

| | | | |
|---|---|---|---|
| 3,611,306 | 10/1971 | Reigal et al. | 340/172.5 |
| 3,611,311 | 10/1971 | Andrews | 340/172.5 |
| 3,312,951 | 4/1967 | Hertz | 340/172.5 |
| 3,333,252 | 7/1967 | Shimabukuro | 340/172.5 |
| 3,541,520 | 11/1970 | Mullery et al | 340/172.5 |
| 3,408,629 | 10/1968 | Haselwood | 340/172.5 |
| 3,355,718 | 11/1967 | Talarczyk | 340/172.5 |

*Primary Examiner*—Paul J. Henon
*Assistant Examiner*—Mark Edward Nusbaum
*Attorney*—R. J. Guenther and William L. Keefauver

[57] ABSTRACT

Techniques are disclosed for permitting the halt and subsequent synchronized restart of a data processing or similar system including a plurality of asynchronous subunits such as magnetic disc memories by generating and storing information indicative of the state of each subunit at the time of halting, and, at the time a system restart is desired, by delaying the restart of individual subunits by an appropriate period which is a function of the previously stored information.

9 Claims, 6 Drawing Figures

INVENTOR
T. R. PETERS
BY William Ryan
ATTORNEY

CONTROLLED PAUSE AND RESTART OF MAGNETIC DISC MEMORIES AND THE LIKE

GOVERNMENT CONTRACT

The invention herein claimed was made in the course of or under a contact with the Department of the Army.

This invention relates to data processing systems. More particularly, this invention relates to data processing systems including rotating mass storage media. Still more particularly, the present invention relates to apparatus for precisely pausing and restarting a data processing system including rotating mass storage devices such as magnetic disc stores.

BACKGROUND AND PRIOR ART

A patent application by the present inventor Ser. No. 32,083 entitled "Controlled Pause in Data Processing Apparatus," filed Apr. 27, 1970 describes a system for precisely pausing a data processing system including one or more asynchronous subunits. While the principles and practices described in the aforesaid patent application are useful in a wide variety of applications and in connection with a variety of asynchronous subunits, there are nevertheless a number of specific asynchronous subunits which include operational characteristics which render more difficult and less efficient than is desirable the straightforward application of the principles and practices described previously. In particular, many data processing systems include magnetic disc memory as alternate, auxiliary or backup storage. These systems typically include one or more magnetic discs for storing information and one or more transducers for selectively reading from and writing information into locations or tracks on these discs. Because of inherent mechanical and other limitations of such disc memory systems, it is often difficult to precisely reproduce the status of such a disc system when treated as a subunit in the sense of the previous application, Ser. No. 32,083.

It may be considered that such disc systems include two operating modes, viz., a "read-write" mode and a "move" mode. While operating in the read-write mode (reading or writing data as requested or directed) the exact position of a magnetic transducer may be determined. However, during a move from one track to another, the previously mentioned limitations prevent an exact prediction or determination of arm position during an in-progress move interrupted by a request for a pause. This failure to determine the exact dynamic parameters of an arm precludes the possibility of duplication of these parameters upon restart.

The mechanical and other limitations including possible misalignment, uneven and extensive wear and power line variations are apparent from a consideration of typical systems described, for example, in U. S. Pat. Nos. 3,353,167 issued Nov. 14, 1967 to H. L. Daniels; 3,474,427 issued Oct. 21, 1969 to W. W. Stevens, Jr; 3,375,507 issued Mar. 16, 1968 to R. A. Gleim et al and 3,503,058 issued Mar. 24, 1970 to C. F. Ault et al.

The problem of reproducing exactly, upon receipt of a restart signal, the conditions existing at the time of initiation of a pause is compounded considerably when more than one transducer is permitted to be independently moving at the same time. That is, not only must the in-motion conditions caused by a specific request be duplicated, but the relative degree of completion of several moves must be duplicated if all are to go back on-line at the same time while occupying exactly the same state as at the time they were interrupted.

It is therefore an object of the present invention to overcome the limitations of a magnetic disc or similar system which prevent it from precisely reproducing a previous incomplete operation.

It is a further object of the present invention to provide in a disc memory system additional apparatus to facilitate the restarting of a disc move operation previously interrupted.

It is a further object of the present invention to simultaneously effect an operative restart of each of a plurality of independently operating disc memory or similar transducers in response to an applied restart signal.

SUMMARY OF THE INVENTION

In brief, the present invention provides in a disc memory or similar system additional circuitry for, among other things, indicating the time elapsed from the beginning of a transducer move operation by counting the number of clock pulses occurring since that time. Such an indication is provided regardless of whether the move goes to completion or is interrupted before completion. When an interrupt signal occurs during a move operation, the then-present count is stored for further processing. Upon restart this count is, in one embodiment, conveniently complemented, the result being preloaded into a counter arranged to count down. The paused transducer is then returned to the origin of its interrupted move and the move is again initiated concurrent with the commencement of count down. When the counter assumes the all-zero state, the transducer is restored to on-line service. When more than one transducer is in motion at the time of pause, each is returned to on-line status at a predetermined time, with relative completion of movement being automatically accomplished.

BRIEF DESCRIPTION OF THE DRAWINGS

A complete description of the present invention is given below in connection with the attached drawing wherein.

DETAILED DESCRIPTION

Figure 1:
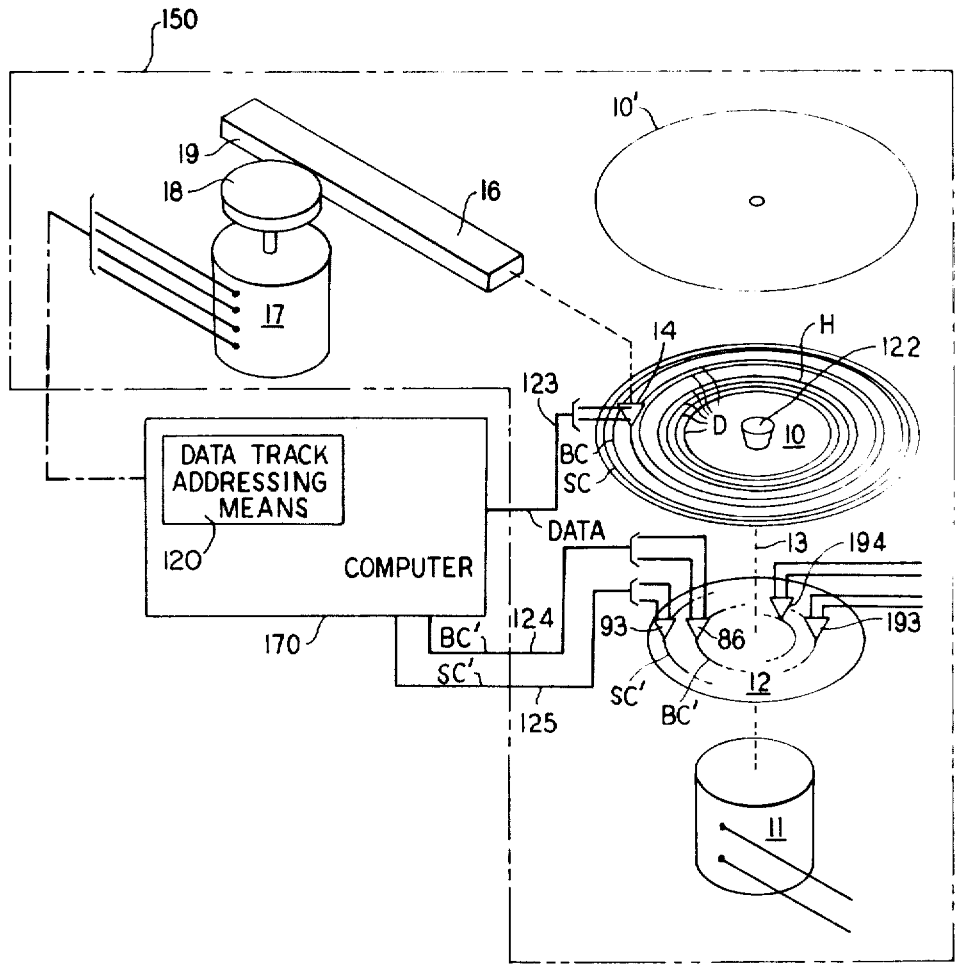
FIG. 1 shows a typical disc memory system having a plurality of magnetic transducers.

As shown schematically in FIG. 1 a typical disc storage system includes a data storage disc 10 having a bit clock, BC and a sector clock SC recorded in the outermost pair of tracks. The bit clock track includes a continuous succession of equally spaced recorded timing pulses or other timing indicia. The spacing of these timing pulses is selected to establish the smallest subdivision of data, normally referred to as a "bit" which is to be recorded upon the data disc. One track spacing removed in an outwardly direction from the bit clock, BC another continuous succession of timing pulses, representing a larger subdivision of the data tracks or sector clock, SC is recorded. It will be evident that other timing data such as character clock tracks representing still further subdivisions of the disc and information thereon, can be recorded for those systems requiring same.

The data storage disc 10 is conveniently arranged to be an interchangeable disc which can be readily removed from its operating spindle and, when in place, is driven by a drive motor 11. The knob 122 schematically represents any suitable means for readily coupling and decoupling either of two or more discs 10, 10' etc. to the drive motor 11, whereby the discs 10 can be selectively interchanged and placed in position to be driven. A permanently installed clock disc 12 is conveniently mounted to be rotated by the same drive spindle as drives disc 10 so that both data disc 10 and clock disc 12 are mechanically synchronized to rotate together about the axis 13. The above described BC and SC tracks and clock disc are useful in exactly locating a desired position within a data track, but are not useful in monitoring transducer motion between tracks.

Means are provided for positioning a magnetic recording transducer 14 radially with respect to disc 10 so that it can read the timing indicia from bit block BC or sector clock SC as well as record and read from data tracks disposed radially inwardly thereof. Thus an access arm 16 is schematically shown supporting transducer 14 and arranged to be driven by a motor 17.

Motor 17 rotates a pinion 18 selectively in either of two directions either continuously or by increments of displacement or "steps." Pinion 18 engages a rack 19 formed along one edge of access arm 16. This rack and pinion arrangement is of standard design and is not shown in detail.

The disc memory as described above is collectively indicated in FIG. 1 as 150. Also shown in FIG. 1 is a computer 170 which is used to control the input output to the memory 150 as well as to perform desired tasks based in part upon data received from memory 150. Thus, there is shown an output lead 123 for conducting read from disc 10 by means of transducer 14. In general, transducer 14 will provide a pair of leads which are grouped for convenience as leas 123. Similarly, the outputs from transducers 86 and 93 are conducted by means of leads 124 and 125, respectively. Information on these leads is, of course, indicative of internal timing and the like. Data appearing on lead 123, on the other hand, represents the information to be utilized by computer 170 or to be stored in response to signals from computer 170. Although only one transducer 14 is shown in connection with disc 10, it is understood that in appropriate circumstances a number of these transducers may be present. Additional transducers 193 and 194 positioned adjacent timing disc 12 are also shown and may be connected to other elements in a larger system.

Computer 170 includes data track addressing means 120 for controlling the positioning of arm 16 and therefore transducer 14.

Figure 2:
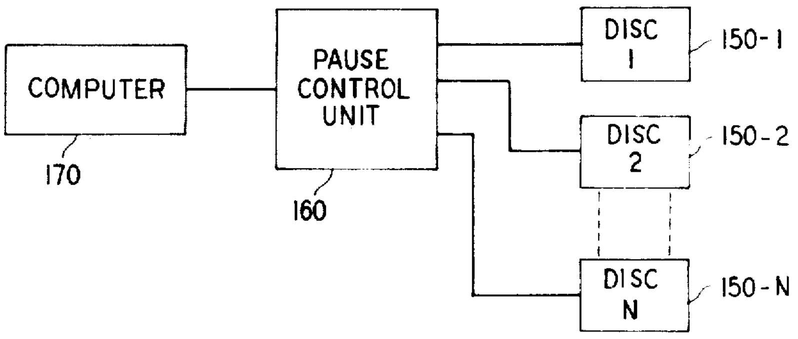
FIG. 2 shows the manner of incorporation of the present invention in a computer system having a plurality of disc memories.

In a typical computer installation, a number of disc storage systems of the type shown, generally in FIG. 1, may be present. FIG. 2 shows a number of disc units of the type shown in FIG. 1, for example, interacting with a computer 170. It will be assumed that there are N disc units 150-1 through 150-N, where N may be any positive integer. Although the disc units are shown in combination with a computer 170, it should be understood that the term computer is meant to include any machine capable of reading information from and/or writing information into one or more of the disc units 150-1 through 150-N.

In typical operation, computer 170 generates a number of requests for specific items of information to be entered into or read from one of the disc units **150*i*. This request typically takes the form of a command or other coded signal indicating that a reading or writing operation is to occur. In addition, information as to the address on the disc is also provided. These signals are in turn decoded by the disc units and motor 17 is operated for a period of time sufficient to drive a transducer affixed to arm 16** to the desired position.

During the course of processing it may be desirable to precisely halt or interrupt the processing of the system shown in FIG. 2. This may be indicated, for example, by preprogrammed control sequence, by a result of a computation in computer 170, or by a real time input to the overall system shown in FIG. 2. Further, it may be desired to restart the entire system in a precise manner at some future time. Thus, it may be desired to precisely pause the system in FIG. 2 in such manner that (except for a lapse in time affecting equally all components of the system) the pause is transparent to a program execution then underway. The block labelled 160 and entitled "Pause Control Unit" in FIG. 2 is used in accordance with the present invention to permit such a pause in a system including disc memory units of the type shown in typical form in FIG. 1.

Because it is not in general possible to immediately halt and restart an in-motion pickup arm such as 16 in FIG. 1 in response to an interrupt signal, it proves convenient to include a counter which initiates an upward count indicative of the time elapsed from the start of a move by such an arm to the time an interrupt request has occurred. This count is conveniently stored until required at restart. Upon restart, the synchronous portions of the system are conveniently inhibited until after the disc arm is set in motion, starting from the beginning position of the move in progress at the time of the interrupt. When the then-present count matches that previously stored count representative of the interrupt time, the disc unit and the synchronous portions of the system are again restored to one-line operation.

Figure 3:
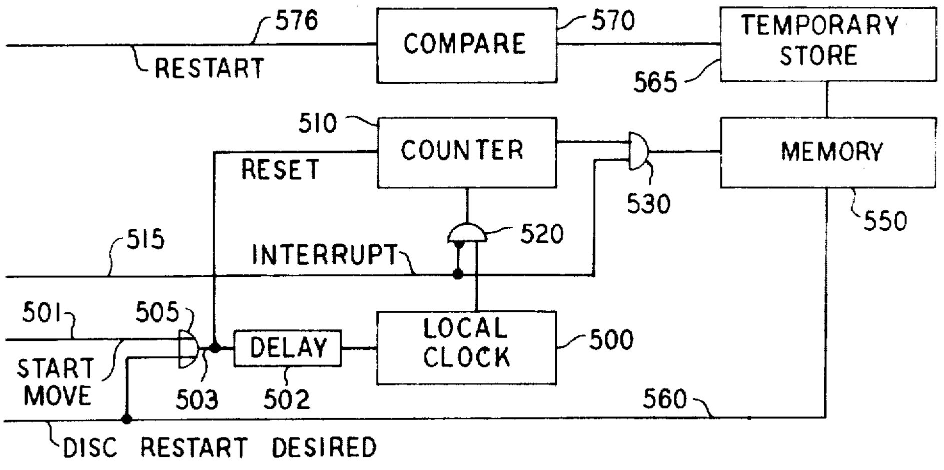
FIG. 3 shows one embodiment of the present invention for the case of a single transducer.

Apparatus embodying this feature for the case of a single transducer is shown in FIG. 3. A signal indicating that a move is to start is applied to local clock 500 by way of lead 501 OR gate 505 and delay unit 502. This causes clock 500 to deliver periodic pulses to counter 510 by way of gate 520. Counter 510 is initialized by the signal originating on lead 501 and appearing on lead 503. When no interrupt occurs, the contents of counter 510 serve no necessary purpose. When an interrupt signal occurs during the course of a move, however, the contents of counter 510 at the time of the interrupt are conveniently transferred by way of AND gate 530 to memory 550. It should be recalled that the move continues for some indefinite time after the interrupt signal is received. The count corresponding to this additional time is not used for restarting purposes because it relates to initial conditions which are not easily duplicated.

When a disc restart is signalled on lead 560, the clock-counter combination again becomes operative, and the arm is restarted at the beginning point of the move previously interrupted. The remaining subunits of the system are not immediately restarted, however. Instead, this complete restarting is delayed until a match condition is indicated by compare circuit 570 based on the count in counter 510 and the previously stored (interrupt time) data which is conveniently transferred to temporary storage register 565. When the match occurs, a restart signal suitable for use as a signal to be provided by restart units **295-*i* in FIG. 3 of the previously mentioned Pat. application Ser. No. 32,083 is generated in a standard fashion on lead 576**. Thus the disc unit is restarted before the synchronous subunits, which are in turn started before the other asynchronous subunits as described in the above-mentioned patent application.

Figure 4:
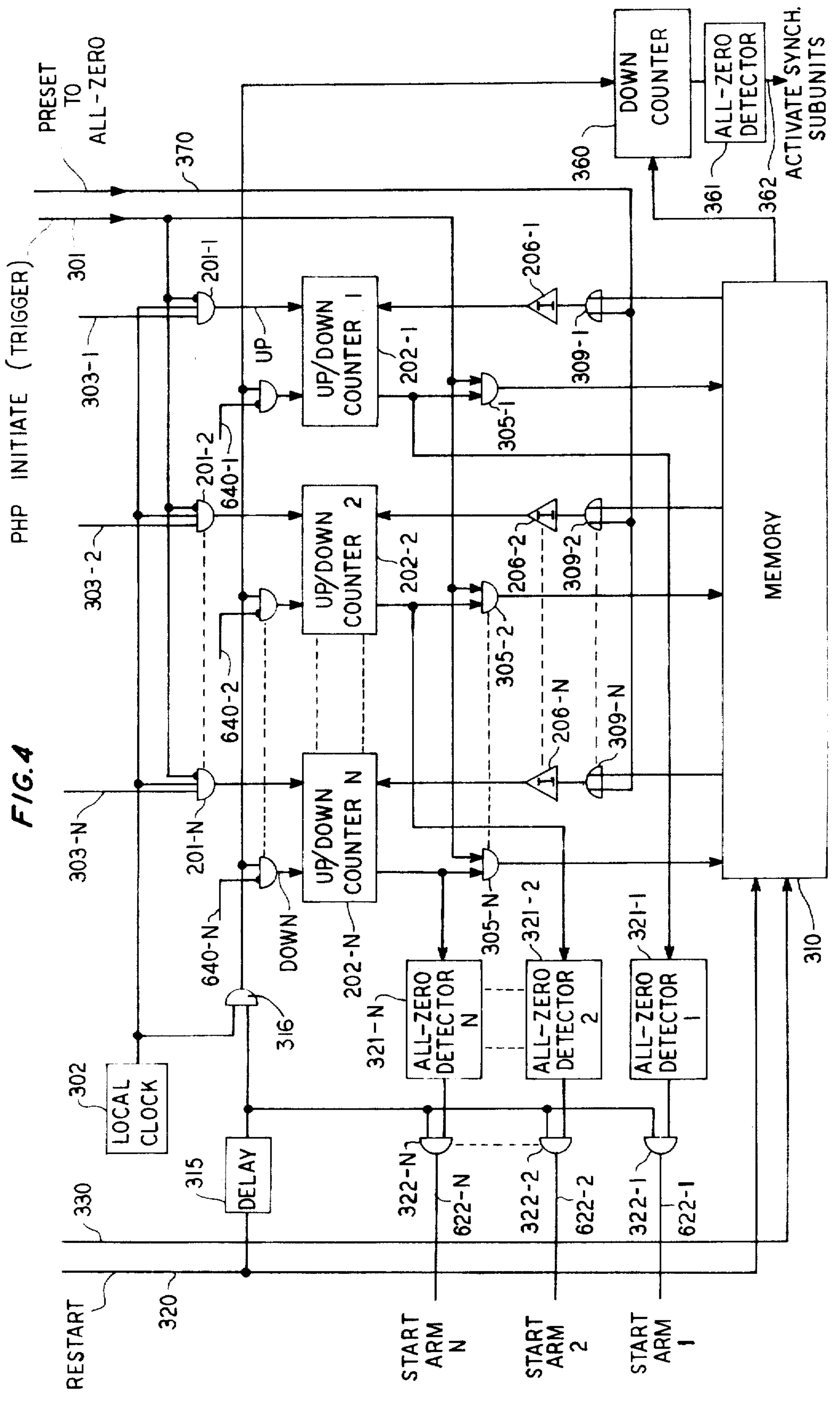
FIG. 4 shows an alternate embodiment of the present invention suitable for operation in a system including a plurality of disc memory units.

FIG. 4 shows a circuit arrangement for use as a pause control circuit in the manner illustrated in FIG. 2, i.e., that where a number of disc memories or similar units may simultaneously have a transducer in transit from one track to another. A trigger level appearing on lead 301 signals the initiation of a desired precise hardware pause. This level is distributed to an inhibit lead input to each of the AND gates 201-1 through 201-N. Because of the inhibit input, signals appearing on lead 301 have no effect except when a pause is desired.

Local clock 302 is arranged to be free running at all times. When an arm movement for arm *i* begins under the control of the computer 170, a signal of constant amplitude (i.e., a level) indicating this is arranged to appear on input lead **303-*i*. This level is supplied by computer 170. Thus, clock pulses from local clock 302 are gated through the appropriate one of gates 201-1 through 201-N to the corresponding up-down counter 202-*i*. Up-down counter 202 *i*** thus records a count indicative of the time elapsed from the outset of a move by transducer *i*. Whenever a level appears on lead 301, however, it is impressed upon each of the gates **201-*i* and has the effect of inhibiting the further advance of all of the counters 202-*i*. Simultaneously, the level appearing on lead 301 enables the contents of each of the counters 202-*i* to pass by way of respective gates 305-*i* to memory 310**.

When, after some intervening interval, it is desired to reestablish the conditions existing at the time that the trigger level was impressed on the circuit of FIG. 4, a restart level is impressed on lead 320. Other information designating which particular restart data are to be used is conveniently supplied on lead 330. This information may be conveniently stored in a pushdown list or in a store under the control of computer 170 in FIG. 2. Alternately, this data may be entered under manual or other separate automatic control. It proves convenient in some cases to store other information indicating, for example, the intended destination for each arm in motion at the time a halt signal arrives on lead 301.

In response to signals applied on leads 320 and 330, memory 310 supplies each of the counters 202-*i* with signals corresponding to the count existing at the time of occurrence of the selected prior PHP trigger signal. The signals actually supplied to the counters 202-*i* pass by way of inverters 206-1 through 206-N. While a single lead is shown with each of these elements, it is understood that in general the data from memory 310 to and from each of the counters 202-*i* is by way of a plurality of leads and corresponding gates and inverters. Thus, the pre-existing contents of counters 202-*i* (at the time of initiation of the pause) are complemented upon commencing a restart operation. The level applied on lead 320, after an appropriate delay supplied by delay unit 315 to permit the complementing and loading, enables gate 316 to pass clock pulses to the count down terminal on each of the counters 202-*i*.

Thus, shortly after a restart level is applied to lead 320, the counters 202-*i* begin a count down starting with a count which is a 1's complement of the count which existed at the time of occurrence of the selected PHP trigger level. Because in general each of the up-down counters 202-*i* will be present with a different initial count, each will arrive at the all-zero condition at a different time. Whenever this condition exists in a given counter, however, a corresponding all-zero detector 321-1 through 321-N detects this condition. Each of the all-zero detectors 321-*i* may conveniently take the form of a simple translation of the outputs of each stage of the counters 202-*i*. AND gates 322-1 through 322-N logically AND the output of the corresponding ones of all-zero detectors 321-*i* with the delayed restart signal at the output of delay unit 315.

In anticipation of a restart signal, or in response to a preliminary restart signal (from which the level on lead 320 may be derived), each of the transducer positioning means e.g., the arms in the apparatus of FIG. 1, are arranged to be positioned at the initial position corresponding to the move in progress at the time the selected pause was initiated. Thus, for example, a signal indicating a desired restart is immediately used to position the arms at the beginning point of a designated move while this same signal is delayed prior to being applied at lead 320 in the circuit of FIG. 4. When signals appearing at the output of gate 322-*i* indicate that the corresponding one of counters 202-*i* has arrived at the all-zero condition, the motion of the corresponding arm is reinitiated. Because the count preset in counters 202-*i* upon a restart is indicative of the relative position of arms involved in a move at the time the selected pause was initiated, the signals on the output of gates 322--*i* appropriately supply the required relative delay among the plurality of motion arms at the time of initiation of the selected pause.

As an example, it will be assumed that four arms $A_1$ through $A_4$ exist in a given system. The status of each of these counters at the time of the occurrence of a PHP trigger level and the preset value in counters 202-*i* after a desired restart has been indicated are shown in both decimal and binary values in Table I.

TABLE I

| Counter Value at Time of PHP Trigger | | | 1's Complement of Counter Value at Time of PHP Trigger | |
|---|---|---|---|---|
| | (binary) | (decimal) | (binary) | (decimal) |
| $A_1$ | 01010 | 10 | 10101 | 21 |
| $A_2$ | 11100 | 28 | 00011 | 3 |
| $A_3$ | 00001 | 1 | 11110 | 30 |
| $A_4$ | 00000 | 0 | 11111 | 31 |

For this example, it has been assumed that the maximum count of counters 202-*i* has a value of $2^5$. This corresponds to a maximum duration that an arm may be in motion of $2^5-1$ clock pulses. Thus, 5 binary stages are required in counters 202-*i*. In other cases the number of stages in the counters 202-*i* need only be sufficient to store a count corresponding to the maximum permissible duration of an arm move.

Figure 5:
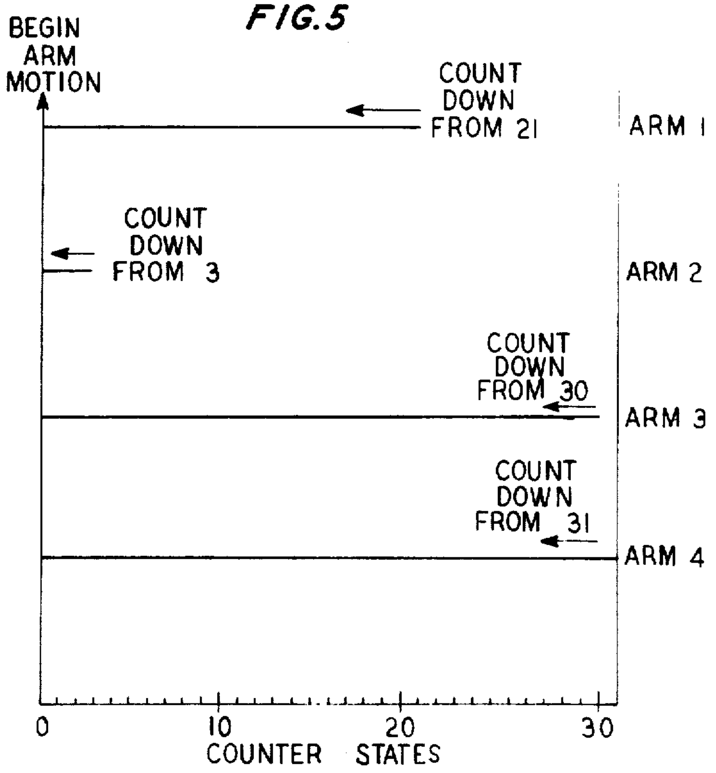
FIG. 5 shows a timing chart illustrating the operation of the circuit of FIG. 3.

FIG. 5 diagrams the progress of the various counters beginning at the time when clock signals begin to pass from clock 302 by way of gate 316 to the respective counters 202-*i*. Thus, it is seen that for counter 1 (202-1) the preset value is 21. Thus, arm 1 is allowed to again begin the move which was previously interrupted only after a period of 21 clock pulses. Similarly, arm 2 is permitted to move only after three clock pulses cause counter 202-2 to count down to zero. Considering only arms 1 and 2 for a moment, it is seen that the effect of employing the circuit of FIG. 4 is to permit arm 2 to begin its motion at a time which is 18 clock pulses earlier than that at which arm 1 is permitted to begin its move. However, it is noted that this is precisely the relationship that the motion of arm 2 bore with respect to arm number 1 at the time that the precise hardware pause was initiated.

Similarly, arms 3 and 4 are associated with counters 202-3 and 202-4, respectively. The effect of storing a count equal to 30 and 31 in counters 202-3 and 202-4, respectively, is to ensure that arms 3 and 4 begin their moves only after 30 and 31 clock pulses, respectively. It is clear that the indicated number of clock pulses required in each case is just sufficient to maintain the desired relative timing at restart.

When all of the counters 202-*i* have achieved the zero state after a count down, the synchronous portions of the computer system being paused may once again begin functioning. It should be noted that at the time that the counter 202-4 (corresponding to arm 4 in this example) reaches the all-zero state, the remaining arms are in exactly the same position as they were at the time that the original halt signal arrived on lead 301. If only the proper relative restart times (for purposes of activating reading or writing) for the respective arms is of concern, only N counters 202-*i* are required.

When the proper activation time relative to the synchronous portions of the system are important, it is convenient to supply a counter such as 360 in FIG. 3. Upon signalling a restart on lead 320, a count indicative of the maximum duration for arm travel (31 in the example given above) is entered into counter 360 which is a count down counter. When counter 360 reaches the all-zero state, all-zero detector 361 provides a signal on lead 362 which is used to indicate that the synchronous portions of the system may once again begin operation. Again the arms are in the same position as at the time a halt signal appeared on lead 301. In the example given above, counter 360 was not needed because one of the arms was not in motion at the time a halt signal arrived, i.e., one counter was loaded with the maximum count of 31 prior to count down.

Figure 6:
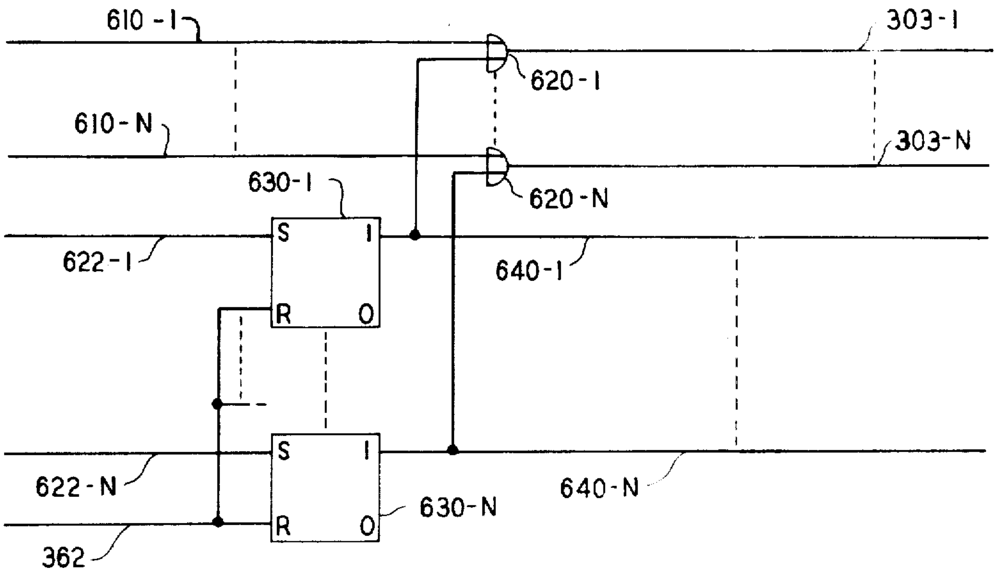
FIG. 6 shows a circuit for providing additional features to the circuit of FIG. 4.

To provide for uniform operation, it is convenient to permit counters 202-*i* to begin their normal count up after a count down to zero upon restart. This is also useful when a second halt signal arrives on lead 301 for the case where a restart of all arms has been effected, (i.e., all of counters 202-*i* have been counted down to zero) but where counter 360 has not yet reached the all-zero state. For this purpose flip-flops 630-1 through 630-N are arranged as shown in FIG. 6 to have these set inputs connected to respective output leads 622-*i* from corresponding gates 322-*i*. The reset inputs of all of the flip-flops 630-*i* are connected to lead 362. The flip-flops 630-*i* are therefore reset after all arms have resumed their paused motion.

The 1 outputs from flip-flops 630-*i* are used as an input to corresponding OR gates 620-*i* to provide a signal on lead 303-*i* to start the count up of counter 202-*i*. The other input to OR gate 620-*i* (on corresponding lead 610-*i*) is the normal indication from the remaining portions of the system (such as computer 170) indicating that an arm motion is beginning.

The 1 outputs from flip-flops 630-*i* are also provided on corresponding leads 640-*i* in FIG. 6 to inhibit further down counting of corresponding counter 202-*i*. This counter is therefore available for counting up (from the all-zero state) as the ith arm progresses in its move.

Not shown in the circuit of FIG. 4 is a reset lead to each counter 202-*i* which resets the counters to the all-zero state prior to beginning a move. This is readily accomplished in well-known fashion by a signal from computer 170 indicating that the last move was successfully completed. Alternately, a signal is derived from the input on the respective lead 303-*i* together with a slight delay where required. The preset to all-zero leads 370 is convenient for restoring all counters to zero upon initial startup or when a new process is to be interposed between the halt and restart i.e., during the pause) of an in-progress progress.

While the above discussion has proceeded in the context of one or more disc memory subunits, it is clear that the principles are clearly applicable to other situations. For example, in a system having a plurality of tape drives the synchronization problem upon pausing is essentially similar to that involving disc memories as described above. In fact, any system having a plurality of asynchronous subunits not having a fixed operational relationship with respect to each other may be effectively paused using the above-described techniques.

When other than binary counters are used, the complementing procedure described above is of course other than the simple binary complementing (interchanging 1's and 0's) shown in FIG. 1. In this sense, the decimal complementing shown there is more general. Thus, if the count corresponding to a maximum duration move is X and the count is a particular counter *i* is Y at the time a halt signal arrives on lead 301, the preset value in counter *i* prior to count down for purposes of restart is X-Y, where X and Y are numbers in any base. The term "complement," therefore, should be read with this broader interpretation.

While reference has been made at various points in the above description to the "synchronous portions of the system," it should be understood that this is meant to indicate, for example, computer 170 in FIG. 1. However, in some instances the portion of the overall system requesting interaction with the disc memory (or other asynchronous subunits) may not be a computer and may not even be synchronous in the usual sense. The single characteristic this "shynchronous" portion must have is that it must be arranged to interact with the asynchronous portions being paused in such manner that an interrupted interaction (such as reading or writing) may be resumed concurrent with a signal (such as that on lead 362) from the paused units.

While the description given above of the present invention has been in terms of a specific apparatus configuration it will be readily understood by those skilled in the art that a programmed machine such as a general purpose computer can readily be programmed to perform the steps in the process described above. It is readily appreciated that each of the individual steps e.g., counting, testing, for zero complementing, etc., are individually well known. One of ordinary skill in the data processing arts will therefore have no difficulty in implementing the above described process by programming a digital computer.

Numerous and varied other embodiments based on the principles and practices described above will occur to those skilled in the art.

What is claimed is:

1. Apparatus for halting operations by a plurality of asynchronous subunits in response to a first signal and restarting them in response to a second applied signal while maintaining the operative conditions existing at the time of said halting comprising a. a memory, b. a plurality of reversible counters each capable of counting up in response to pulse signals applied to a first input terminal and of counting down in response to pulse signals applied at a second input terminal, each of said counters being associated uniquely with a respective one of said plurality of subunits, c. a source of clock pulse signals, d. means for applying said clock pulse signals to the first input terminal of selected ones of said counters, e. means responsive to said first input signal for storing in said memory the count in each of said counters at the time of said first input signal, f. means responsive to said second input signal for presetting said counters with a count which is the complement of the respective ones of said stored counts, g. means further responsive to said second input signal for applying said clock pulse signals to the second input terminal of each of said counters, and h. means responsive to a preselected condition in respective ones of said counters for indicating that the restart of the subunits associated with said respective ones of said counters may proceed.

2. Apparatus according to claim 1 wherein said means for applying said clock pulse signals to said first input terminal comprises means responsive to the initiation of an operation by at least one of said subunits, thereby to cause the count in each of said counters prior to said second input signal to be indicative of the time elapsed since the associated subunits began an operation.

3. Apparatus according to claim 2 wherein said means responsive to a preselected condition comprises means responsive to a condition indicating that an operation is about to begin.

4. Apparatus according to claim 1 wherein said counters are binary counters having a sufficient number of stages to count the number of clock pulses occuring in an interval of duration equal to the maximum possible period of operation of said associated subunit, and wherein said counts which are the complement of said stored counts are the 1's complements of said stored counts.

5. Apparatus according to claim 4 wherein said means for presetting comprises an inverter having an input and an output associated with each stage in each of said counters, means for applying signals indicative of the condition of the corresponding bits in the respective ones of said stored counts at the input of said associated inverters, and means for applying the output of each inverter to said associated stage in said counter.

6. In a system comprising a plurality of subunits each capable of performing at least one operation, said operations in respective subunits bearing no predetermined timing relation to each other, apparatus for restoring synchronism with respect to the timing of said operations in said plurality of subunits after a pause in the functioning of said subunits, said synchronism being with respect to the degree of completion of the respective operations interrupted by said pause, comprising a. means for measuring the elapsed time from the beginning of an operation to the time that said pause began, b. means for storing for each subunit a first number which is an indication of said time elapsed from the beginning of an operation to the time that said pause began, and c. means for restarting the operation of each subunit at the beginning point of said operation after a period of time indicated by the number which is the complement of said first number.

7. A disc memory system the functional operation of which may be precisely paused in response to an applied interrupt signal and precisely restarted in response to an applied restart signal comprising at least one rotatable magnetic surface having a plurality of tracks thereon, a plurality of magnetic transducers individually translatable over a plurality of said tracks in response to applied respective positioning signals, a plurality of counting means for measuring the time elapsed from the arrival of said respective positioning signals until each of said arms is positioned at a location indicated by said signals, means for halting each of said counting means in response to said interrupt signal, means for complementing the count indicated by each of said counting means at the time said interrupt signal occurs, means for repositioning said transducers beginning at an initial position substantially identical to the starting position of the move interrupted by said interrupt signal, means for simultaneously commencing count down of all of said counting means, and means for restarting the positioning of each of said repositioned transducers when the respective one of said counting means indicates a count equal to zero.

8. In a system comprising a plurality of subunits each capable of performing at least one operation, said operations in each of a selected group of said subunit bearing no predetermined timing relation to operations in others of said selected group, the method of maintaining synchronism with respect to the timing of said operations in said plurality of subunits after a pause in a sequence of operations by at least some of said plurality of said subunits comprising a. storing, for each subunit in said selected group with an operation in progress at the time said pause began, a first number which is indicative of the time elapsed from the beginning of an operation to the time that said pause began,
b. restarting each subunit in said selected group with an operation in progress at the time said pause began at the beginning point of said operation in progress at the time said pause began after a period of time indicated by the number which is the complement of said first number, and
c. restarting the remainder of said plurality of subunits after each of said selected group of subunits has been started.

9. In a system comprising a plurality of subunits each capable of performing at least one asynchronous operation, said asynchronous operations in each of said subunits bearing no fixed predetermined timing relation to such operations in any other subunit, the method of restoring synchronism of operations in all of said subunits after an interrupt in all of said operations, said synchronism being with respect to the relative degree of completion of the respective asynchronous operations, said method comprising the steps of a. detecting a request to restore said synchronism, and
b. restarting each of the interrupted asynchronous operations at the beginning point of said interrupted asynchronous operations after respective relative delays indicated by corresponding respective ones of a first set of numbers, said first set of numbers being the complement of respective ones of a second set of numbers, each of said second set of numbers being indicative of the time elapsed from the beginning of the corresponding interrupted asynchronous operation until the time the interrupt occurred, said relative delays being measured with respect to said request to restore synchronism.

* * * * *